United States Patent
Guo et al.

(10) Patent No.: US 9,049,618 B2
(45) Date of Patent: Jun. 2, 2015

(54) METHOD AND APPARATUS FOR CHANNEL MEASUREMENT REPORTS IN A WIRELESS COMMUNICATION SYSTEM

(75) Inventors: Yu-Hsuan Guo, Taipei (TW); Ko-Chiang Lin, Taipei (TW)

(73) Assignee: INNOVATIVE SONIC CORPORATION, Taipei (TW)

( * ) Notice: Subject to any disclaimer, the term of this patent is extended or adjusted under 35 U.S.C. 154(b) by 470 days.

(21) Appl. No.: 12/970,730

(22) Filed: Dec. 16, 2010

(65) Prior Publication Data
US 2011/0143749 A1 Jun. 16, 2011

Related U.S. Application Data

(60) Provisional application No. 61/287,186, filed on Dec. 16, 2009.

(51) Int. Cl.
*H04W 24/10* (2009.01)
*H04L 5/00* (2006.01)
*H04J 11/00* (2006.01)
*H04W 36/00* (2009.01)
*H04L 27/26* (2006.01)

(52) U.S. Cl.
CPC ............ *H04W 24/10* (2013.01); *H04J 11/0093* (2013.01); *H04W 36/0072* (2013.01); *H04L 27/2601* (2013.01); *H04L 5/0096* (2013.01)

(58) Field of Classification Search
CPC ..... H04L 5/0098; H04L 5/001; H04L 5/0096; H04L 1/0026; H04L 27/2601; H04W 24/10; H04W 36/06; H04W 36/26; H04J 11/0093
USPC ......... 455/450, 451, 452, 453, 509, 511, 512, 455/514, 516, 517, 510
See application file for complete search history.

(56) References Cited

U.S. PATENT DOCUMENTS

| | | | |
|---|---|---|---|
| 7,924,754 B2 * | 4/2011 | Bergman et al. | 370/310 |
| 8,515,477 B2 * | 8/2013 | Yamamoto et al. | 455/513 |
| 8,811,350 B2 * | 8/2014 | Chung et al. | 370/332 |
| 2005/0032514 A1 * | 2/2005 | Sadri et al. | 455/423 |
| 2008/0219370 A1 | 9/2008 | Onggosanusi et al. | |
| 2009/0067386 A1 | 3/2009 | Kitazoe | |
| 2009/0247223 A1 | 10/2009 | Yu et al. | |

(Continued)

FOREIGN PATENT DOCUMENTS

EP 2282575 A1 * 2/2011 ............ H04W 24/10

OTHER PUBLICATIONS

Office Action on corresponding foreign application (TW 099144147) from TIPO dated Dec. 27, 2013.

(Continued)

*Primary Examiner* — Nizar Sivji
(74) *Attorney, Agent, or Firm* — Blue Capital Law Firm, P.C.

(57) ABSTRACT

A method and apparatus for aperiodic CQI/PMI/RI reports in a wireless communication system is disclosed. The wireless communication system supports carrier aggregation that enables a user equipment of the wireless communication system to perform transmission and/or reception using multiple component carriers. The method includes reporting CQI/PMI/RI for multiple component carriers. When the user equipment needs to report CQI/PMI/RI for a deactivated component carriers, a special value may be used to signal the condition. Alternatively, the user equipment indicates with the reported CQI/PMI/RI which component carriers are measured.

12 Claims, 6 Drawing Sheets

(56) References Cited

U.S. PATENT DOCUMENTS

| | | | |
|---|---|---|---|
| 2010/0118720 A1* | 5/2010 | Gauvreau et al. | 370/252 |
| 2010/0120431 A1* | 5/2010 | Hwang et al. | 455/436 |
| 2010/0130137 A1* | 5/2010 | Pelletier et al. | 455/68 |
| 2012/0155408 A1* | 6/2012 | Pedersen et al. | 370/329 |
| 2012/0282968 A1* | 11/2012 | Toskala et al. | 455/517 |

* cited by examiner

METHOD AND APPARATUS FOR CHANNEL MEASUREMENT REPORTS IN A WIRELESS COMMUNICATION SYSTEM

CROSS REFERENCE TO RELATED APPLICATIONS

This application claims the benefit of U.S. Provisional Application No. 61/287,186, filed on Dec. 16, 2009 and titled "Method and Apparatus for Improving Aperiodic CQI/PMI/RI Report in a Wireless Communication System," the contents of which are incorporated herein by reference.

BACKGROUND

The present invention relates to wireless communication systems and, more particularly, to a method and apparatus capable of effectively handling reports signaling a channel quality indicator, a precoding matrix indicator, and/or a rank indicator in a wireless communication system having carrier aggregation.

The desire for high data rates in wireless communication systems has steadily increased. Accordingly, the complexity of the wireless communication systems has also increased. Communication from a base station, or node B, to a mobile device, or user equipment, is termed downlink communication, and communication from the user equipment to the node B is termed uplink communication. To provide more efficient communication, reference signals may be transmitted downlink from the node B to the user equipment in a radio channel. The user equipment analyzes the signal it receives to measure characteristics of the channel, and the user equipment transmits an indication of the downlink characteristics (often termed a channel quality indicator or CQI) from the user equipment to the node B. In a basic form, the CQI indicates the characteristics, such as the signal to noise ratio, of a single channel over frequency. The node B in turn may modify, based on the CQI from the user equipment, how it transmits downlink in order to more effectively communicate.

Higher speed wireless communication systems use multiple-input multiple-output (MIMO) technology where both node B and user equipment have multiple antennas. Accordingly, there are multiple channels between the node B and the user equipment: one for each combination of node B antenna and user equipment antenna. Thus, the user equipment may transmit increased information to indicate the increased variety of communication characteristics that may occur.

Still higher speed wireless communication systems add carrier aggregation technology where multiple component carriers are combined to transmit data between the user equipment and node B. This increases the amount of possible communication characteristics. Additionally, the component carriers may differ for downlink and uplink communication and may change dynamically. Thus, it may be difficult to supply current measurement results of the communication characteristics without impacting communication of user data.

SUMMARY OF THE INVENTION

In one aspect, the invention provides a method for reporting measurement results from a user equipment in a wireless communication system that supports carrier aggregation. The method includes: receiving information about transmission of a report including measurement results; and transmitting the report, wherein, when the information includes a request to report measurement results for a problematic component carrier, a predefined value for the problematic component carrier is included in the report.

In another aspect, the invention provides a method for reporting measurement results from a user equipment in a wireless communication system that supports carrier aggregation. The method includes: receiving a request to transmit a report including measurement results; and transmitting the report and an indication of which downlink component carriers are associated with measurement results in the report.

In another aspect, the invention provides a wireless communication device. The wireless communication device includes: receiver circuitry configured to receive radio-frequency signals; transmitter circuitry configured to supply radio-frequency signals; a processor coupled to the receiver circuitry and the transmitter circuitry and configured to execute a program; and a memory coupled to the processor for storing the program, wherein the program comprises instructions that configure the processor to: command receiving information about transmission of a report including measurement results; and command transmitting the report, wherein, when the information includes a request to report measurement results for a problematic component carrier, a predefined value for the problematic component carrier is included in the report.

These and other aspects of the invention are more fully comprehended upon review of this disclosure and the accompanying drawings.

DETAILED DESCRIPTION

The exemplary wireless communication systems, devices, and related methods described below employ a wireless communication system supporting broadband service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP2 UMB (Ultra Mobile Broadband), WiMax, or some other modulation techniques.

In particular, the exemplary wireless communication systems, devices, and methods described below may be designed to support one or more standards such as the standards offered by a consortium named "3rd Generation Partnership Project" referred to herein as 3GPP, including Document No. 3GPP TS 36.213 ("Evolved Universal Terrestrial Radio Access (E-UTRA): Physical Layer Procedures (Release 8)"), which is expressly incorporated herein.

Figure 1:
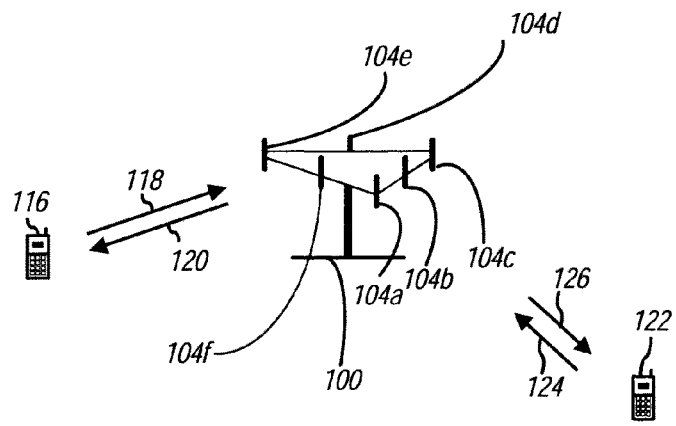
FIG. 1 is a diagram of a wireless communication system in accordance with aspects of the invention.

FIG. 1 is a diagram of a wireless communication system in accordance with aspects of the invention. A radio access network (RAN) 100 includes a plurality of antennas 104a-f. A first user equipment (UE) 116 communicates with the RAN 100 by sending information to the RAN 100 through an upstream link 118 and receiving information from the RAN 100 through a downstream link 120. A second UE 122 communicates with the RAN 100 by sending information through an upstream link 124 and receiving information through a downstream link 126. In FIG. 1, the RAN 100 and the UEs 116, 122 illustrate the structure of the wireless communication system. Practically, the RAN 100 may include many base stations (node Bs), radio network controllers, and so on according to actual demands in a particular implementation. Additionally, there are commonly many UEs, which may be devices such as mobile phones, computer systems, etc.

Each UE may include multiple antennas with the uplink and downlink including many physical paths. Details of the particular scheme the RAN 100 uses to communicate with the first and second UEs 116, 122 may vary with the characteristics of the channels between the antennas of the RAN 100 and the antennas of the first and second UEs 116, 122. Accordingly, the UEs may send information to the RAN regarding characteristics of the channel derived from analysis of the signals they receive.

The communication between RAN and UE uses resource blocks defined by frequencies and time intervals. The time intervals may be parts of subframes that are parts of frames, for example, frames divided into ten subframes. The resource blocks are allocated for various purposes. One purpose is downlink control information (DCI) that is transmitted to the UEs in a physical downlink control channel (PDCCH). The DCI generally signals downlink and uplink scheduling information. The DCI may have several formats, for example, a format 0 with information such as a frequency hopping configuration, a resource block assignment, a modulation and coding scheme, and a request that a UE send channel measurement results.

Figure 2:
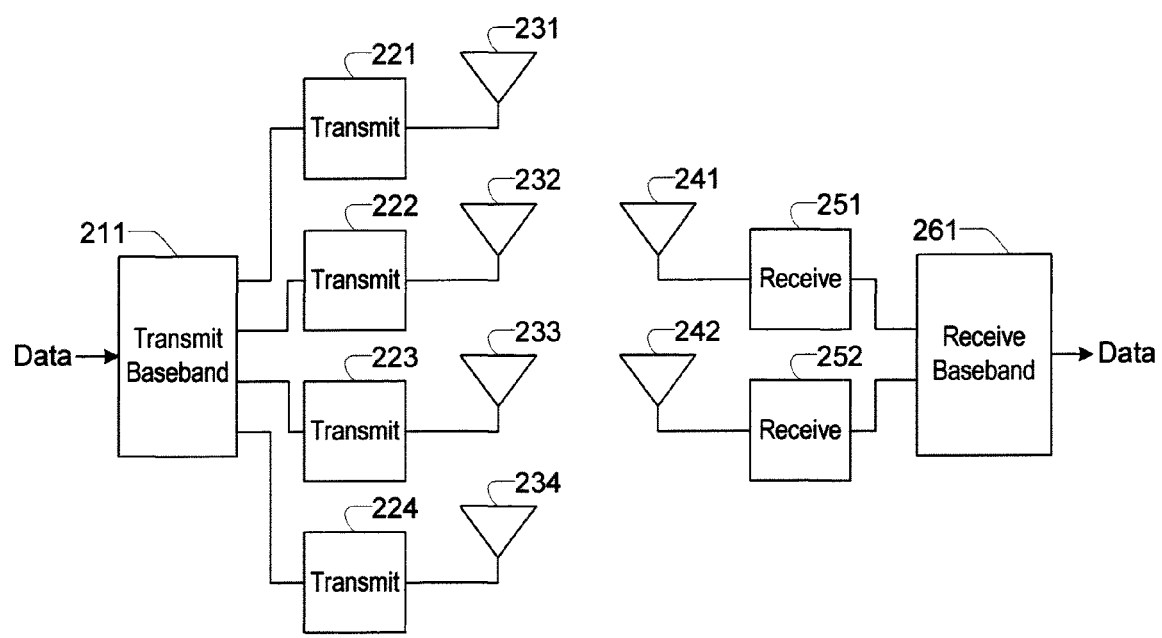
FIG. 2 is a block diagram of a transmitter and receiver in accordance with aspects of the invention.

FIG. 2 is a block diagram of a multi-antenna transmitter and a multi-antenna receiver in accordance with aspects of the invention. The transmitter of FIG. 2 includes a baseband transmit block 211 coupled to four transmit blocks 221-224, each coupled to one of four transmit ante 231-234. Signals from the transmit antennas 231-234 are received by two receive antennas 241-242, each coupled to one of two receive blocks 251-252 coupled to a baseband receive block 261. Generally, data to be transmitted is received by the baseband transmit block 211 where it is used to produce four data streams to be transmitted from each of the transmit antennas 231-234. Similarly, signals from the receive antennas 241-242 are combined in the baseband receive block 261 to supply received data.

The transmitter and receiver of FIG. 2 are simplified for ease of illustration. Each block of the transmitter and receiver may include other blocks. Additionally, a base station or a user equipment commonly includes both a transmitter and a receiver with shared antennas. The transmitter may transmit data in a manner that varies with characteristics of the paths between the transmit antennas 231-234 and the receive antennas 241-242. For this, the receiver supplies measurement information about the signals it receives to the transmitter. In addition to a channel quality indicator (CQI) the measurement information may include a rank indicator (RI) that indicates the number of spatial layers that can be supported by the channel experienced at the UE. The measurement information may also include a precoding matrix indicator (PMI) suggesting a precoding matrix for use in the baseband transmit block 211 based on the channel conditions observed by the receiver.

Figure 3:
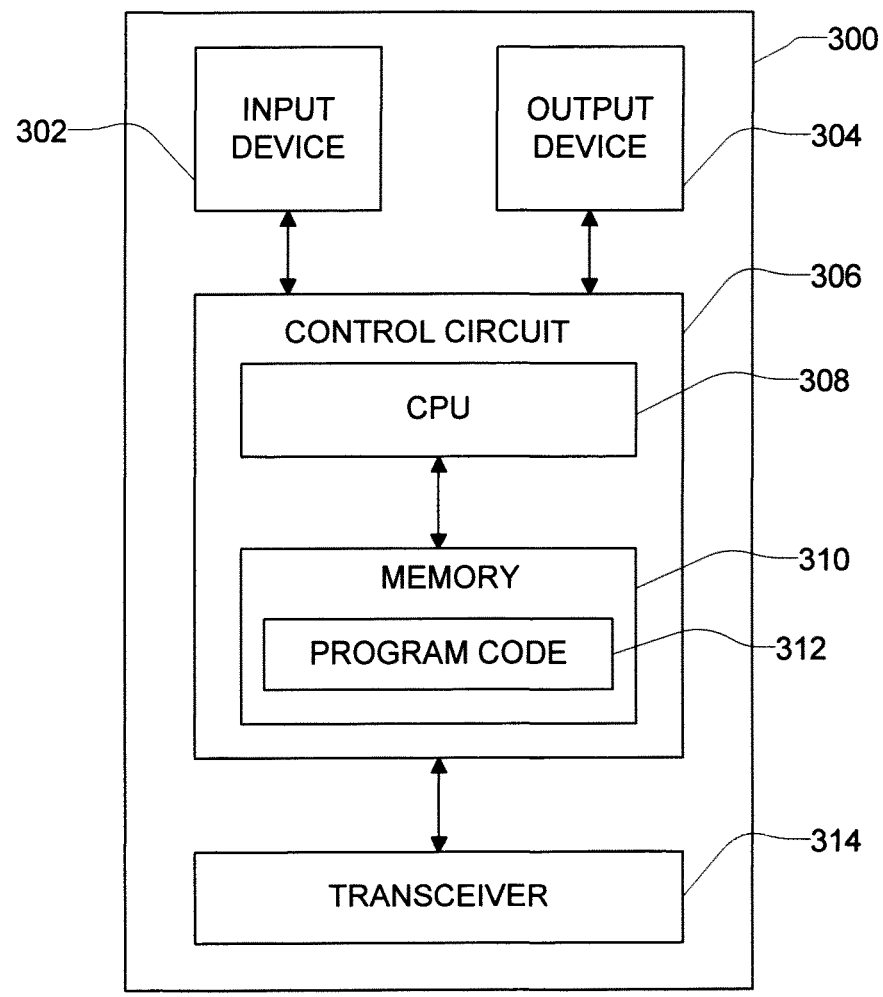
FIG. 3 is a block diagram of a wireless communication device in accordance with aspects of the invention.

FIG. 3 is a block diagram of a wireless communication device in accordance with aspects of the invention. The wireless communication device 300 may be utilized in the user equipment in the wireless communication system of FIG. 1. For the sake of brevity, FIG. 3 only shows an input device 302, an output device 304, a control circuit 306, a central processing unit (CPU) 308, a memory 310, a program 312, and a transceiver 314 of the communication device 300. In the communication device 300, the control circuit 306 executes the program 312 in the memory 310 through the CPU 308 thereby controlling an operation of the communication device 300. The communication device 300 can receive signals input by a user through the input device 302, such as a keyboard, and can output images and sounds through the output device 304, such as a display or speaker. The transceiver 314 is used to receive and transmit wireless signals. The transceiver 314 delivers received signals to the control circuit 306 and wirelessly transmits signals generated by the control circuit 306. In some implementations of the wireless communication device 300, the transceiver 314 may follow principles illustrated in the transmitter and receiver of FIG. 2. From a perspective of a communication protocol framework, the transceiver 314 may be associated with portions of Layer 1, and the control circuit 306 may be associated with portions of Layer 2 and Layer 3.

Figure 4:
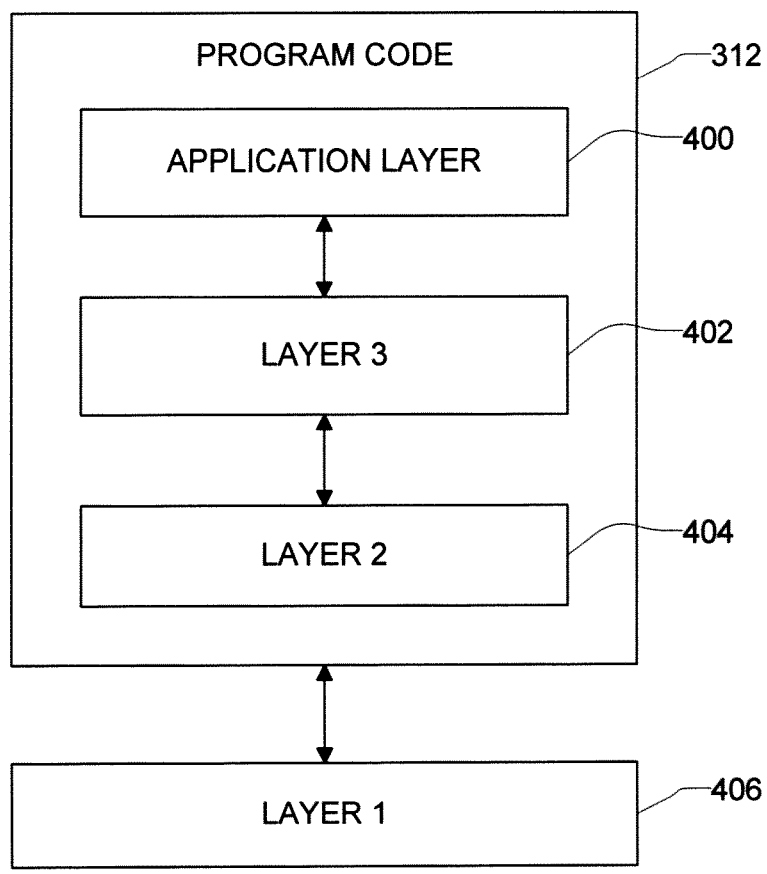
FIG. 4 is a diagram of a program for a wireless communication device in accordance with aspects of the invention.

FIG. 4 is a diagram of the program 312 for the wireless communication device 300 of FIG. 3. The program 312 includes an application layer 400, a Layer 3 402, and a Layer 2 404 and is coupled to a Layer 1 406. The Layer 3 402 performs radio resource control. The Layer 2 404 includes a radio link control (RLC) layer and a Medium Access Control (MAC) layer and performs link control. The Layer 1 406 performs physical connections. In the LTE-A system, the Layer 1 406, the Layer 2 404, and the Layer 3 402 may support carrier aggregation, which enables the UE to perform data transmission and/or reception using multiple component carriers.

In the following discussion, the invention is described mainly in the context of the 3GPP architecture reference model. However, it is understood that with the disclosed information, one skilled in the art could readily adapt for use and implement aspects of the invention in other network architectures.

As described in 3GPP TS 36.213, in LTE systems, a UE reports channel characteristics to a node B. The channel characteristics include a channel quality indicator (CQI), a precoding matrix indicator (PMI), and a rank indicator (RI) as described above with reference to FIG. 2. The UE may send a CQI/PMI/RI report aperiodically. The UE sends the aperiodic CQI/PMI/RI report using physical uplink shared channel (PUSCH). The aperiodic CQI/PMI/RI report is triggered when the UE receives downlink control information (DCI) having format 0 or a random access response grant if the respective CQI request field is set to 1 and is not reserved. When the UE receives a request in a subframe n, the UE transmits the CQI/PMI/RI report in a subsequent subframe n+k, where k may depend on a configuration and on the value of n.

In LTE-A, which uses carrier aggregation, the possible contents of the CQI/PMI/RI report increases. A CQI/PMI/RI report, in one possibility, only includes CQI/PMI/RI of one downlink component carrier. A CQI/PMI/RI report, in another possibility, includes CQI/PMI/RI of multiple downlink component carriers. Including CQI/PMURI of multiple downlink component carriers in the CQI/PMI/RI report may reduce the signalling overhead, the number of required uplink grants, and latency. However, complexity relative to LTE systems may be increased.

CQI/PMI/RI reports for multiple component carriers may be implemented in various ways. In one implementation, the UE reports CQI/PMI/RI according to a configuration that indicates which downlink component carrier or carriers are reported. The configuration is supplied by a node B by radio resource control (RRC) signalling, for example, using an RRCConnectionReconfiguration message. This implementation may result in the node B expecting the UE to report CQI/PMI/RI of a deactivated downlink component carrier. This can occur because the UE may implicitly activate or deactivate a downlink component carrier or the UE may miss an explicit activation or deactivation signalling. Thus, the understanding of whether a downlink component carrier is activated may differ between node B and UE. The UE does not need to receive PDCCH or physical downlink shared channel (PDSCH) on a deactivated downlink component carrier. Thus, the UE does not know how to report the CQI/PMI/RI because the UE is unable to measure a deactivated downlink component carrier (in time to report).

In another implementation, the UE reports CQI/PMI/RI according to an indication in the PDCCH or a random access response (RAR) that indicates which downlink component carrier or carriers are reported. This implementation may also result in the node B expecting the UE to report CQI/PMI/RI of a deactivated downlink component carrier.

In another implementation, the UE reports CQI/PMI/RI for all activated downlink component carriers. This implementation may result in the node B not being able to exactly know which downlink component carrier or carriers will be included in the aperiodic CQI/PMI/RI report. This can also occur because the understanding of whether a downlink component carrier is activated may differ between node B and UE. There are also some difficulties for node B in decoding the PUSCH. Furthermore, the UE may not have a sufficiently large uplink grant to include all required CQI/PMI/RI in the PUSCH. Moreover, a UE may need to report CQI/PMI/RI of a downlink component carrier that has an operation problem.

In a scheme for CQI/PMI/RI reports in a system with carrier aggregation, a special value, for example, zero in all or parts of the various fields, is used to indicate problematic component carriers. For example, when an aperiodic CQI report needs to be transmitted and the report should include measurement results for a deactivated downlink component carrier or a downlink component carrier that is considered to be failed, the special value of CQI is used to indicate CQI of the deactivated or failed downlink component carrier. A timer T310 is used to determine whether radio link failure occurs due to physical layer problems. The timer T310 may be started when a configured number of consecutive out-of-sync conditions are detected. The timer T310 is stopped when a configured number of consecutive in-sync conditions are detected. A downlink component carrier is considered to be failed when the timer T310 corresponding to the downlink component carrier expires.

Thus, the UE always reports CQI/PMI/RI of each downlink component carrier that node B requests. If the UE is unable to make measurements for a downlink component carrier, the UE reports a special value for that component carrier. The report is transmitted and triggered as described above. A CQI/PMI/RI report may include a channel quality indicator, a precoding matrix indicator, a rank indicator, other downlink measurement results, or a combination thereof.

The aperiodic report may, in some embodiments, include a measurement result for each configured downlink component carrier. The aperiodic report may, in some embodiments, include a measurement result for each downlink component carrier that is in an RRC reporting configuration. The aperiodic report may, in some embodiments, include a measurement result for each downlink component carrier indicated by a PDCCH or a RAR.

In some embodiments, values of periodic CQI, PMI, or RI may be multiplexed to the aperiodic report. To multiplex the periodic CQI, PMI, or RI values to the aperiodic report, the values may be put together or concatenated with the values of aperiodic CQI, PMI, RI requested by the node B. Additionally, the periodic values may be for a downlink component carrier not associated with the aperiodic CQI, PMI, or RI.

The UE may, in some embodiments, not monitor PDCCH on deactivated downlink component carriers. The UE may also not receive PDSCH on deactivated downlink component carriers. Accordingly, the UE does not report measurement results for a deactivated downlink component carrier.

In another scheme for CQI/PMI/RI reports in a system with carrier aggregation, a special value is also used to indicate problematic component carriers. For example, when a UE is configured to transmit periodic CQI reports and one of the reports needs to include a measurement result for a deactivated downlink component carrier or a downlink component carrier that is considered to be failed, the special value of CQI is used to indicate CQI of the deactivated or failed downlink component carrier.

In another scheme for CQI/PMI/RI reports in a system with carrier aggregation, indications of which component carriers with measurement results are represented in the reports are transmitted from a UE. The UE receives a request to transmit an aperiodic CQI/PMI/RI report. Measurement results for which downlink component carrier or carriers are to be included in the report may be indicated in the request or previously configured. The UE transmits the aperiodic CQI/PMI/RI report and an indication of which component carrier or carriers are associated with measurement results in the report. The downlink component carrier or carriers that have associated measurement results included in the aperiodic report can be different from the downlink component carrier or carriers that are preconfigured or indicated to be included. In one example, the report may include measurement results for only a subset of preconfigured downlink component carriers and omit measurement results for downlink component carriers that are not activated.

The UE may transmit the report on PUSCH. The UE may also transmit the indication of component carriers on PUSCH. However, in some embodiments, the reports and the indication are separately encoded. An example of channel coding is block coding. The block coding consists of several basis sequences and whether a basis sequence is present in the output depends on the value of its associated information bits. The encodings may use a fixed or a configured code rate. The indication, in some embodiments, is encoded with a code rate computed from a reference code rate. Additionally, the reference code rate may be the code rate of associated data multiplexed on PUSCH. Alternatively, the reference code rate may be the code rate of the associated aperiodic CQI/PMI/RI report.

Furthermore, the code rate of the aperiodic CQI/PMI/RI report may be computed from the smallest payload size of the aperiodic CQI/PMI/RI report for all configured component carriers, for example, the size for rank equal one for all configured component carriers. The code rate of the aperiodic CQI/PMI/RI report may also be computed from the smallest payload size of an aperiodic CQI/PMI/RI report for the indicated component carriers. The code rate of the aperiodic CQI/PMI/RI report may also be computed from the smallest payload size of an aperiodic CQI/PMI/RI report for the activated component carriers.

In various embodiments, the UE transmits the indication of component carriers in the aperiodic CQI/PMI/RI report. The indication of component carriers and the aperiodic CQI/PMURI report may also be transmitted in a same transmit time interval.

The UE may transmit the indication of component carriers as a bitmap. The bitmap may have a bit that corresponds to each downlink component carrier. Alternatively, the UE may transmit the indication of component carriers by indicating the number of downlink component carriers that have corresponding measurement results in the aperiodic CQI/PMI/RI report. In another alternative, the UE may transmit the indication of component carriers as an index of downlink component carriers.

Figure 5:
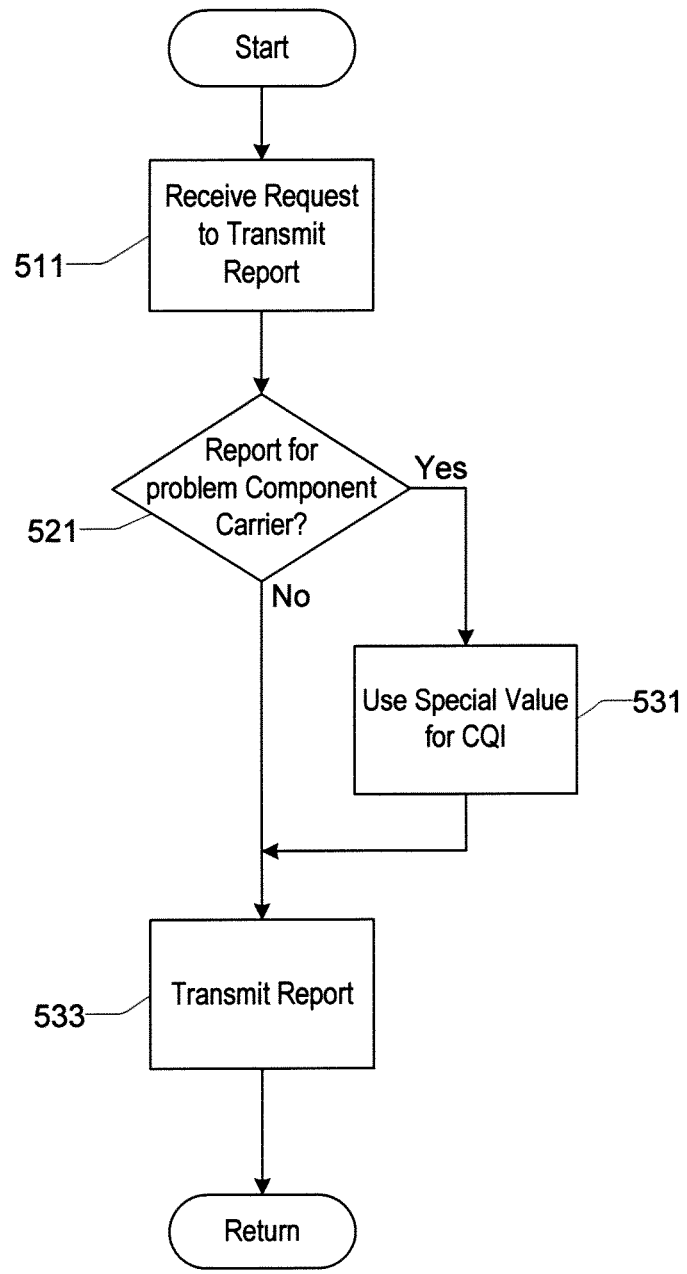
FIG. 5 is a flowchart of a process for reporting measurement results from user equipment in accordance with aspects of the invention.

FIG. 5 is a flowchart of a process for reporting measurement results from user equipment in accordance with aspects of the invention. The process is utilized in a UE of a wireless communication system that includes carrier aggregation. In step 511, the process receives a request to transmit a measurement report. More specifically, the request may be to transmit a report indicating a measurement result of a downlink channel, such as a channel quality indicator, a precoding matrix indicator, or a rank indicator.

The process, in step 521, determines if the requested report includes a request for measurement for component carriers that are problematic. A problem may arise, for example, when a component carrier is deactivated. If the process determines a component carrier problem, the process continues to step 531; otherwise, the process continues to step 533.

In step 531, the process supplies a special value in the report to signal the problem component carrier. In step 533, the process transmits the requested measurement report. Thereafter the process returns.

Figure 6:
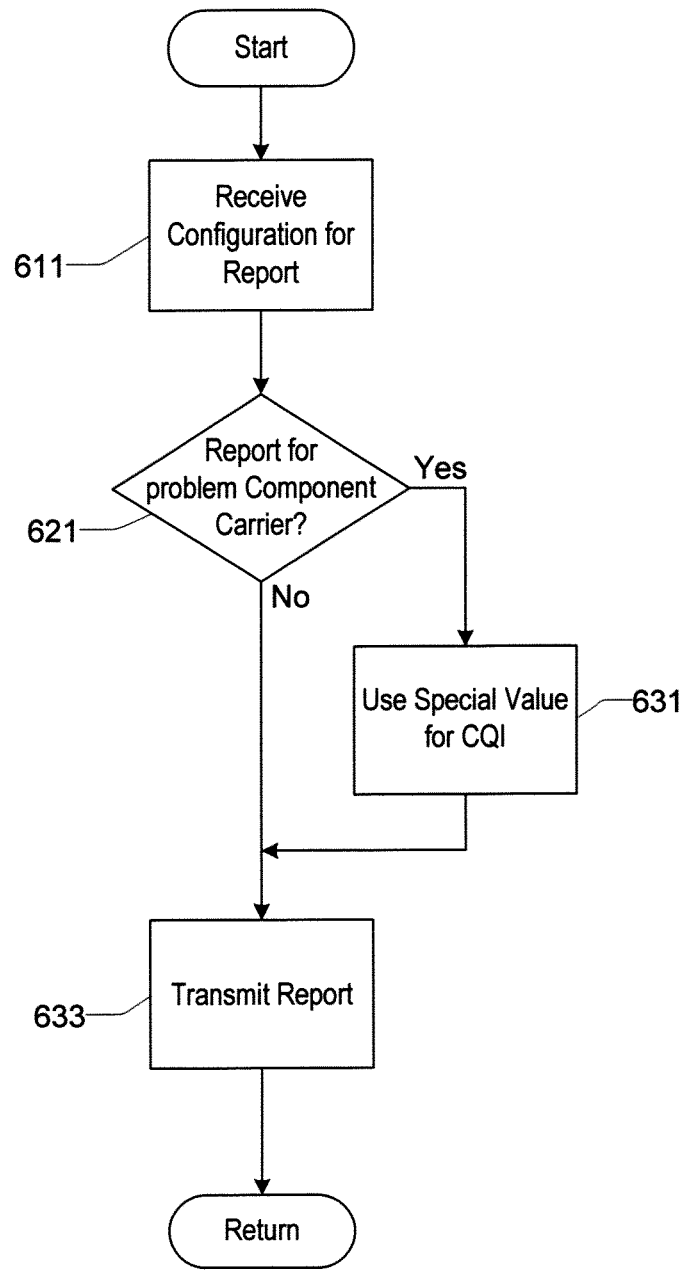
FIG. 6 is another flowchart of a process for reporting measurement results from user equipment in accordance with aspects of the invention.

FIG. 6 is a flowchart of another process for reporting measurement results from user equipment in accordance with aspects of the invention. The process is also utilized in a UE of a wireless communication system that includes carrier aggregation. In step 611, the process receives a configuration for a measurement report, for example, a periodic CQI/PMI/RI report, to be transmitted from the UE.

The process, in step 621, determines if the configured report includes a measurement result for component carriers that are problematic, for example, a component carrier that is deactivated. If the process determines a component carrier problem, the process continues to step 631; otherwise, the process continues to step 633. In step 631, the process supplies a special value in the report to signal the problem component carrier. In step 633, the process transmits the requested measurement report. Thereafter the process returns.

Figure 7:
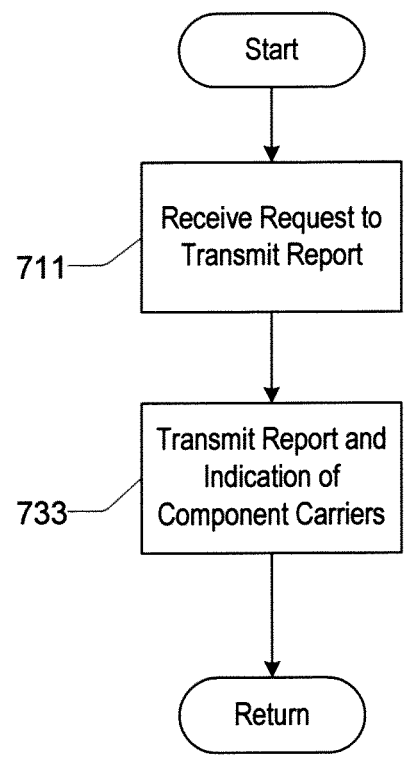
FIG. 7 is another flowchart of a process for reporting measurement results from user equipment in accordance with aspects of the invention.

FIG. 7 is a flowchart of another process for reporting measurement results from user equipment in accordance with aspects of the invention. The process is also utilized in a UE of a wireless communication system that includes carrier aggregation. In step 711, the process receives a request to transmit a measurement report. Measurement results for which downlink component carrier or carriers are to be included in the report may be indicated in the request or previously configured.

The process, in step 721, the process transmits the requested measurement report and an indication of which component carriers with measurement results are represented in the report. Thereafter the process returns. The component carriers with measurement result represented in the report may differ from the requested or configured component carriers.

The steps of a method or algorithm described in connection with aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, a DVD, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may include packaging materials.

Although the invention has been discussed with respect to various embodiments, it should be understood the invention comprises the novel and unobvious claims, and their insubstantial variations, supported by this disclosure.

What is claimed is:

1. A method for reporting measurement results from a user equipment in a wireless communication system that supports carrier aggregation, the method comprising:
   receiving information about transmission of a report including a measurement result for a downlink component carrier; and
   transmitting the report, wherein the report needs to include a measurement result for a deactivated downlink component carrier that the user equipment is unable to measure in time, the report includes a predefined value as the measurement result for the deactivated downlink component carrier;
   wherein the user equipment does not monitor a physical downlink control channel (PDCCH) or receive a physical downlink shared channel (PDSCH) on the deactivated downlink component carrier, and
   wherein the measurement result is selected from the group consisting of a channel quality indicator, a precoding matrix indicator, a rank indicator, and combinations thereof.

2. The method of claim 1, wherein the information about transmission of the report comprises a request to transmit an aperiodic report.

3. The method of claim 1, wherein the information about transmission of the report comprises a configuration for the report, and wherein the report is transmitted periodically.

4. The method of claim 3, wherein the report is transmitted on a physical uplink control channel.

5. The method of claim 1, wherein the predefined value is zero (0).

6. The method of claim 1, wherein the report includes measurement results for a set of downlink component carriers selected from the group consisting of each configured downlink component carrier, each downlink component carrier that is in an radio resource control reporting configuration, each downlink component carrier indicated by a physical downlink control channel, and each downlink component carrier indicated by a random access response.

7. A wireless communication device comprising:
receiver circuitry configured to receive radio-frequency signals;
transmitter circuitry configured to supply radio-frequency signals;
a processor coupled to the receiver circuitry and the transmitter circuitry and configured to execute a program; and
a memory coupled to the processor for storing the program, wherein the program comprises instructions that configure the processor to:
command receiving information about transmission of a report including a measurement result for a downlink component carrier; and
command transmitting the report, wherein the report needs to include a measurement result for a deactivated downlink component carrier that the user equipment is unable to measure in time, the report includes a predefined value as the measurement result for the deactivated downlink component carrier;
wherein the wireless communication device does not monitor a physical downlink control channel (PDCCH) or receive a physical downlink shared channel (PDSCH) on the deactivated downlink component carrier, and
wherein the measurement result is selected from the group consisting of a channel quality indicator, a precodinq matrix indicator, a rank indicator, and combinations thereof.

8. The wireless communication device of claim 7, wherein the information about the transmission of the report comprises a request to transmit an aperiodic report.

9. The wireless communication device of claim 7, wherein the information about transmission of the report comprises a configuration for the report, and wherein the report is transmitted periodically.

10. The wireless communication device of claim 7, wherein the report is transmitted on a physical uplink control channel.

11. The wireless communication device of claim 7, wherein the predefined value is zero (0).

12. The wireless communication device of claim 7, wherein the report includes measurement results for a set of downlink component carriers selected from the group consisting of each configured downlink component carrier, each downlink component carrier that is in an radio resource control reporting configuration, each downlink component carrier indicated by a physical downlink control channel, and each downlink component carrier indicated by a random access response.

* * * * *